No. 851,572. PATENTED APR. 23, 1907.
W. O. TUBBS.
SPRING WHEEL.
APPLICATION FILED DEC. 20, 1906.
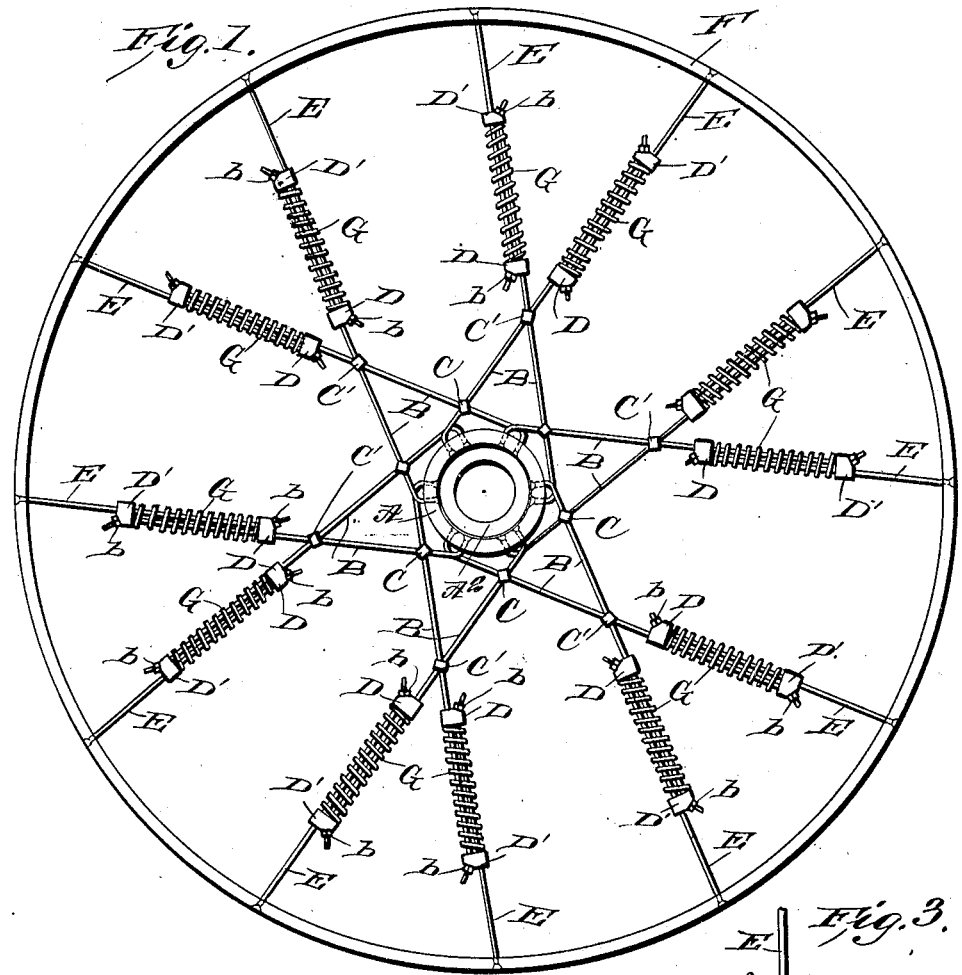
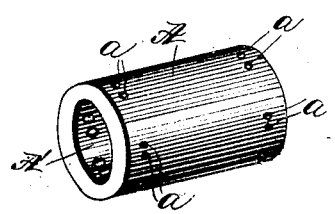
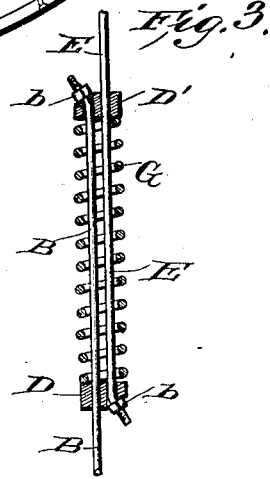
WITNESSES
INVENTOR
WILLIAM OSCAR TUBBS
BY
ATTORNEYS

UNITED STATES PATENT OFFICE.

WILLIAM OSCAR TUBBS, OF LUBBOCK, TEXAS.

SPRING-WHEEL.

No. 851,572.  Specification of Letters Patent.  Patented April 23, 1907.

Application filed December 20, 1906. Serial No. 348,679.

*To all whom it may concern:*

Be it known that I, WILLIAM OSCAR TUBBS, a citizen of the United States, residing at Lubbock, in the county of Lubbock and State of Texas, have invented a new and useful Improvement in Spring-Wheels, of which the following is a specification.

My invention relates to improvements in wheels for vehicles, its object being to reduce jar and produce a wheel which shall be simple, cheap and efficient.

The pneumatic tires generally used on vehicles, such as automobiles, are costly and are extremely liable to puncture and other damage, to repair which involves considerable time and expense. It is to overcome these objections that I have devised the improvements hereinafter pointed out, and to these ends my invention consists in certain novel features of construction, arrangement and combination of parts as will be hereinafter fully described and pointed out in the claims, reference being had to the accompanying drawings, in which Figure 1 is a side elevation of my improved wheel. Fig. 2 is a perspective view of the hub. Fig. 3 is an enlarged sectional elevation showing tension device.

My wheel which is composed entirely of steel consists of the hub A having the central opening A' within which the box A² is secured; the hub near each end is provided with the openings $a$ which are arranged in series of twos and within which are secured the inner ends of spoke sections B; each section B passes through the clamps C, C' and then through the collars D, D'.

E are outer spoke sections which are secured at their outer ends to the flexible steel rim F and then pass through the collars D and D' before mentioned; after passing through the collars D the inner ends of spoke sections E are bent outwardly and have nuts $b$ threaded thereon. The outer ends of spoke sections B after passing through the outer collars D' are also bent outwardly and have threaded thereon the nuts $b$.

G are coiled springs surrounding the overlapping portions of the spoke sections B and E between the collars D and D' for the purpose of regulating the tension of the springs and truing the wheel. The rim F is made of spring steel and is flexible so that the portion resting on the ground during travel will flatten and assume the shape of the road, the resiliency of the wheel being due partly to the flexibility of the rim and partly to the springs G which surround the overlapping ends of the spoke sections.

As shown in Fig. 3 the outer face of the collars D and D' is beveled off where the threaded ends of the spoke sections pass through them.

The clamps C and C' may be of any suitable material and construction.

I claim

1. A wheel consisting of a hub and a flexible rim, spoke sections secured respectively in said hub and rim and overlapping each other and coiled springs surrounding the overlapped portions of the spoke sections.

2. A wheel consisting of a hub and a flexible rim, spoke sections secured respectively in said hub and rim and overlapping each other at their free ends, collars on the overlapped ends of said spoke sections, and coiled springs surrounding said overlapped portions and abutting against the said collars.

3. A wheel consisting of a hub and a flexible rim, spoke sections secured respectively in said hub and rim, and overlapping each other at their free ends, a collar mounted on each spoke section through which the end of the other spoke section passes, a coiled spring surrounding the overlapped ends of the spoke sections between the collars, and adjustable means on the end of each spoke section for regulating the tension of the coiled springs.

4. A wheel consisting of a hub and a flexible rim, spoke sections secured respectively in said hub and rim, the spoke sections secured to the hub being bent to cross each other, clamps securing the spoke sections together at their crossing points, each spoke section secured to the rim extending inwardly and overlapping the outer end of one of the hub spoke sections, collars on each spoke section through which the end of the overlapping spoke section passes, coiled spring surrounding the overlapped ends of the adjacent spoke sections between the aforesaid collars, and adjusting nuts on the ends of the spoke sections outside of the collars, for regulating the tension of the coiled springs.

W. OSCAR TUBBS.

Witnesses:
W. D. BENSON,
THORE TUBBS.